US011321025B2

(12) United States Patent
Mori

(10) Patent No.: US 11,321,025 B2
(45) Date of Patent: May 3, 2022

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Hiroshi Mori, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/711,165

(22) Filed: Dec. 11, 2019

(65) Prior Publication Data
US 2020/0192612 A1 Jun. 18, 2020

(30) Foreign Application Priority Data
Dec. 18, 2018 (JP) .............................. JP2018-236394

(51) Int. Cl.
*G06F 3/12* (2006.01)
*H04N 1/60* (2006.01)

(52) U.S. Cl.
CPC .......... *G06F 3/1208* (2013.01); *G06F 3/1242* (2013.01); *H04N 1/6008* (2013.01); *G06F 3/1256* (2013.01)

(58) Field of Classification Search
CPC .... G06F 3/1208; G06F 3/1256; H04N 1/6008
USPC ............... 358/1.15, 1.9, 2.1, 2.99, 3.01, 518
See application file for complete search history.

(56) References Cited

U.S. PATENT DOCUMENTS

| 2013/0038900 A1* | 2/2013 | Henry ................... G06F 3/1215 358/1.15 |
| 2014/0078526 A1* | 3/2014 | Suzuki ................... H04N 1/387 358/1.9 |
| 2017/0364317 A1* | 12/2017 | Nagasaka ............. G06F 3/1284 |

FOREIGN PATENT DOCUMENTS

| JP | 2008-028917 A | 2/2008 |
| JP | 2017-024321 A | 2/2017 |

* cited by examiner

*Primary Examiner* — Quang N Vo
(74) *Attorney, Agent, or Firm* — Canon U.S.A., Inc. IP Division

(57) ABSTRACT

An image forming apparatus that executes hidden-surface elimination can output an image containing an undercoat desired by a user. The image forming apparatus includes an elimination unit that eliminates a region included in a region of a second drawing object in a layer below a first drawing object and overlapping the first drawing object. The first drawing object is contained in an intermediate data which is generated based on page description language data. In a case where the second drawing object is not a drawing object indicating an undercoat image, the elimination unit eliminates the region included in the region of the second drawing object and overlapping the first drawing object. In a case where the second drawing object is a drawing object indicating an undercoat image, the elimination unit does not eliminate the region included in the region of the second drawing object and overlapping the first drawing object.

9 Claims, 14 Drawing Sheets

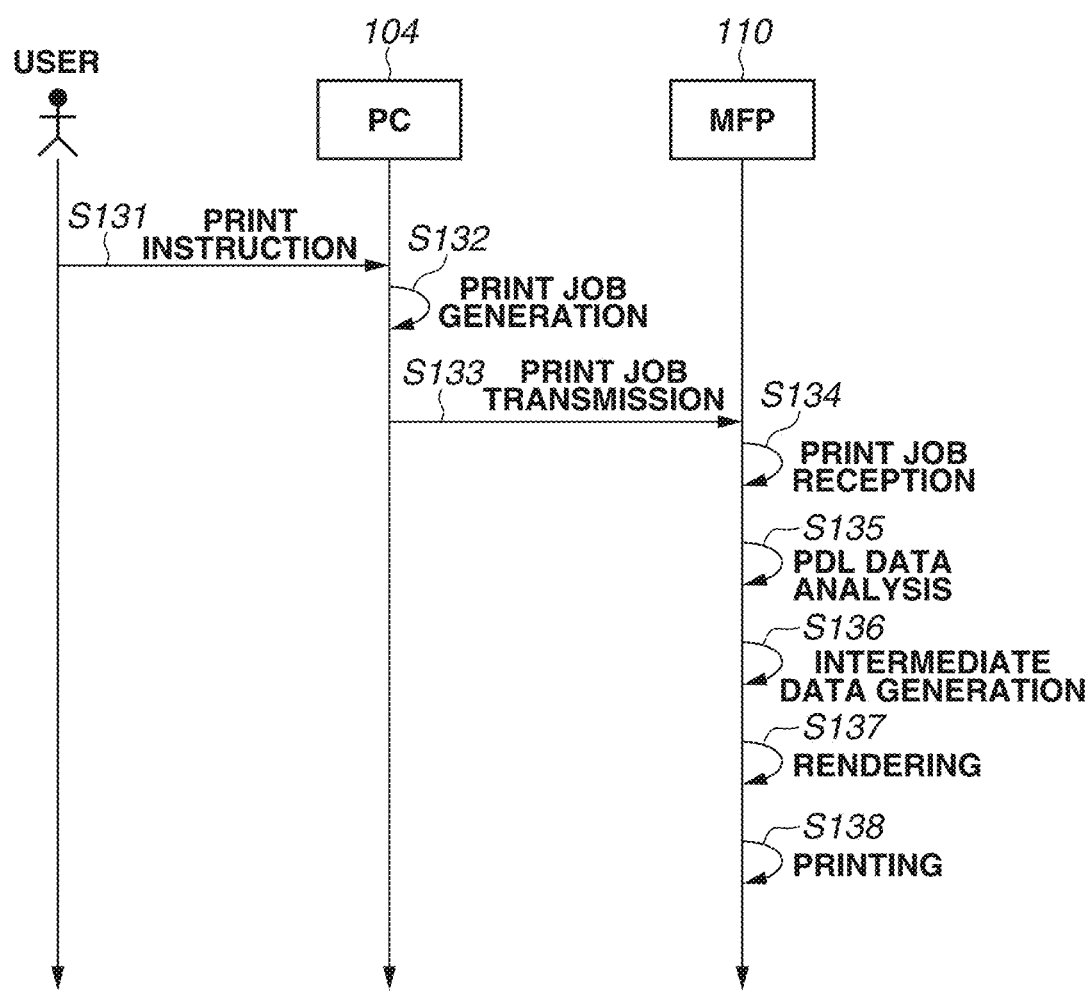

FIG.5
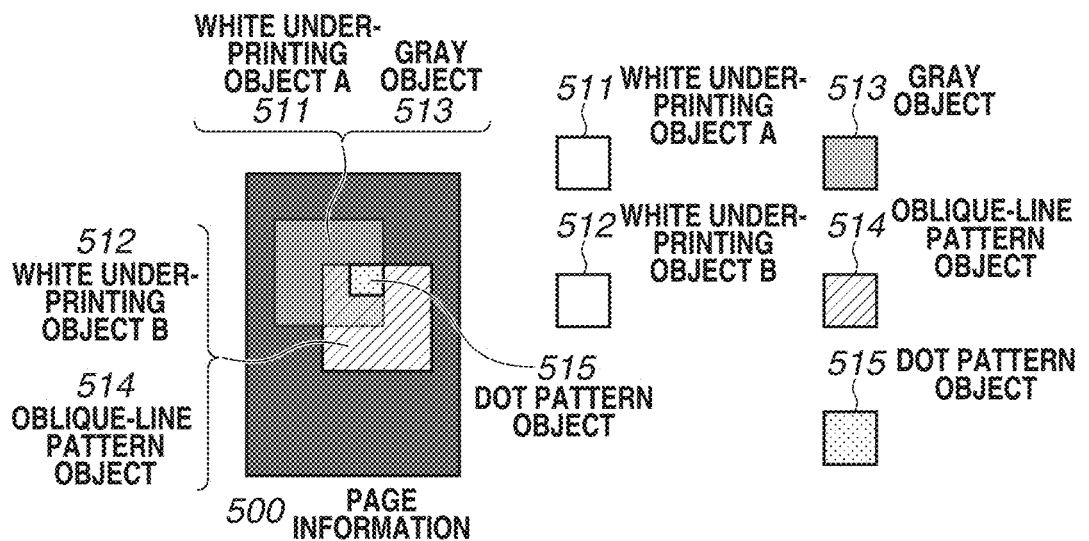
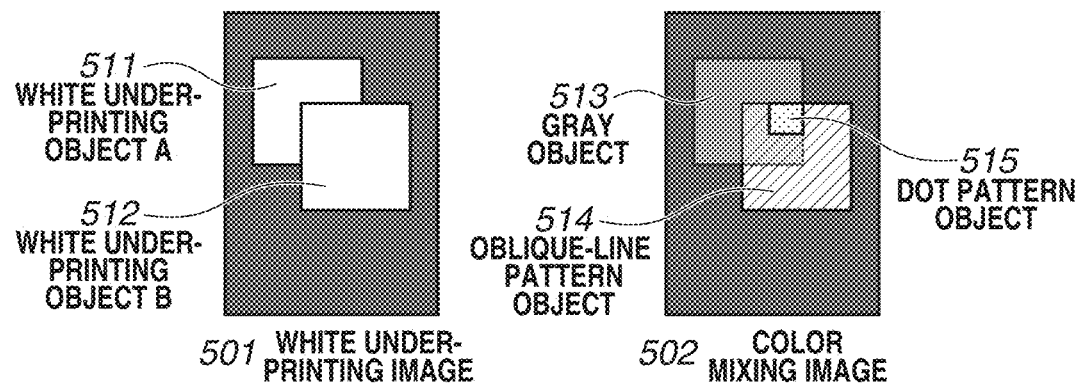

FIG.7C

DATA STRUCTURE OF CLOSED REGIONS (BEFORE HIDDEN-SURFACE ELIMINATION)

| | | | | | |
|---|---|---|---|---|---|
| CLOSED REGION B 702 | PIXEL LENGTH: 1280 PIX NUMBER OF OBJECTS: 2 | FILL TYPE: FLAT (WHITE) USAGE INFORMATION: UNDER-PRINTING COMBINING INFORMATION: OVERPAINT | FILL TYPE: FLAT (GRAY) USAGE INFORMATION: UNSPECIFIED COMBINING INFORMATION: OVERPAINT | | |
| CLOSED REGION C 703 | PIXEL LENGTH: 800 PIX NUMBER OF OBJECTS: 4 | FILL TYPE: FLAT (WHITE) USAGE INFORMATION: UNDER-PRINTING COMBINING INFORMATION: OVERPAINT | FILL TYPE: FLAT (GRAY) USAGE INFORMATION: UNSPECIFIED COMBINING INFORMATION: OVERPAINT | FILL TYPE: PATTERN (OBLIQUE LINES) USAGE INFORMATION: UNSPECIFIED COMBINING INFORMATION: 50% TRANSPARENT | |
| CLOSED REGION D 704 | PIXEL LENGTH: 960 PIX NUMBER OF OBJECTS: 1 | FILL TYPE: FLAT (WHITE) USAGE INFORMATION: UNDER-PRINTING COMBINING INFORMATION: OVERPAINT | FILL TYPE: FLAT (GRAY) USAGE INFORMATION: UNSPECIFIED COMBINING INFORMATION: OVERPAINT | FILL TYPE: PATTERN (OBLIQUE LINES) USAGE INFORMATION: UNSPECIFIED COMBINING INFORMATION: 50% TRANSPARENT | FILL TYPE: PATTERN (DOTS) USAGE INFORMATION: UNSPECIFIED COMBINING INFORMATION: OVERPAINT |
| CLOSED REGION E 705 | PIXEL LENGTH: 1280 PIX NUMBER OF OBJECTS: 1 | FILL TYPE: PATTERN (OBLIQUE LINES) USAGE INFORMATION: UNSPECIFIED COMBINING INFORMATION: 50% TRANSPARENT | | | |

PROCESSING LINES

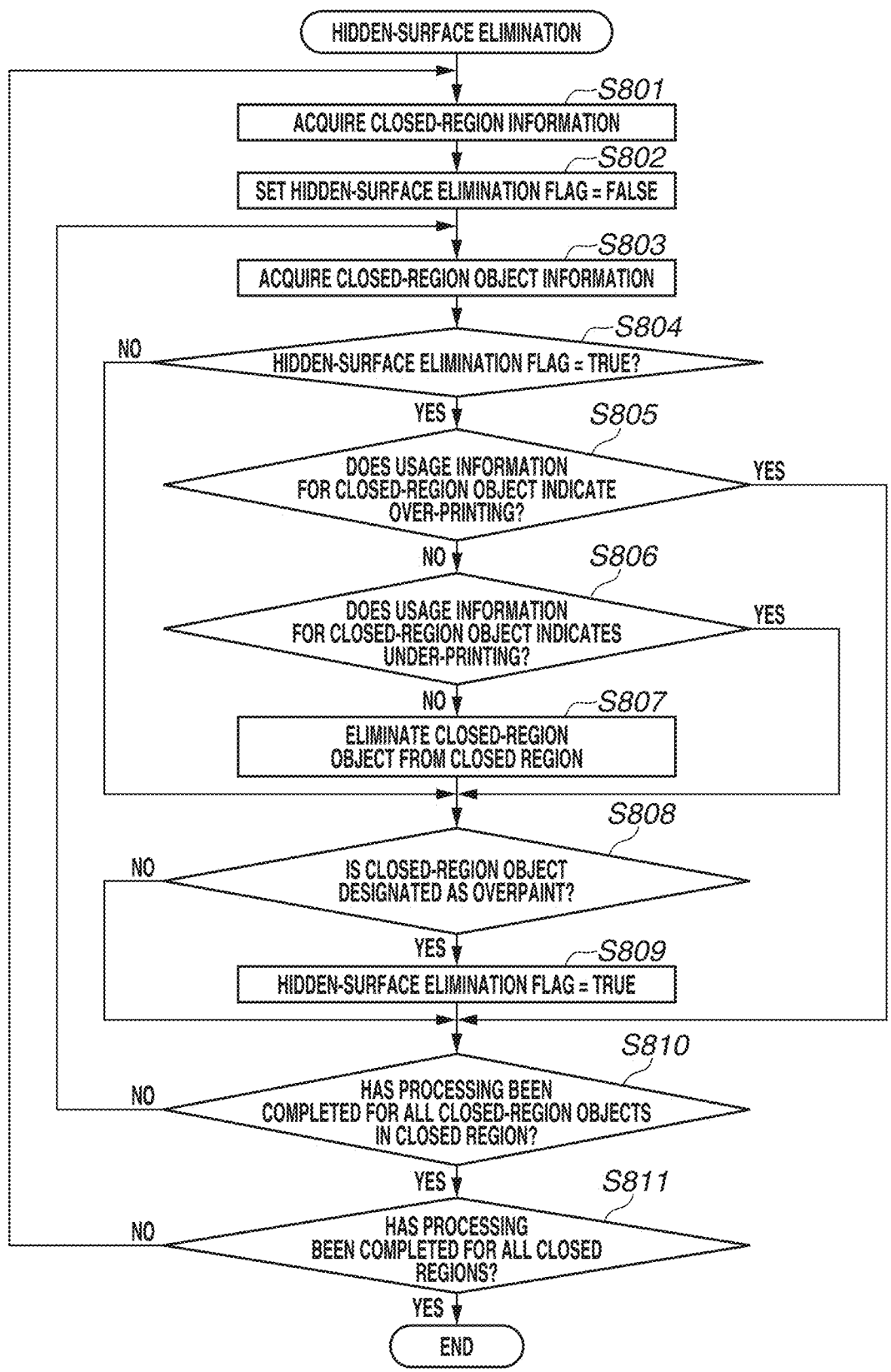

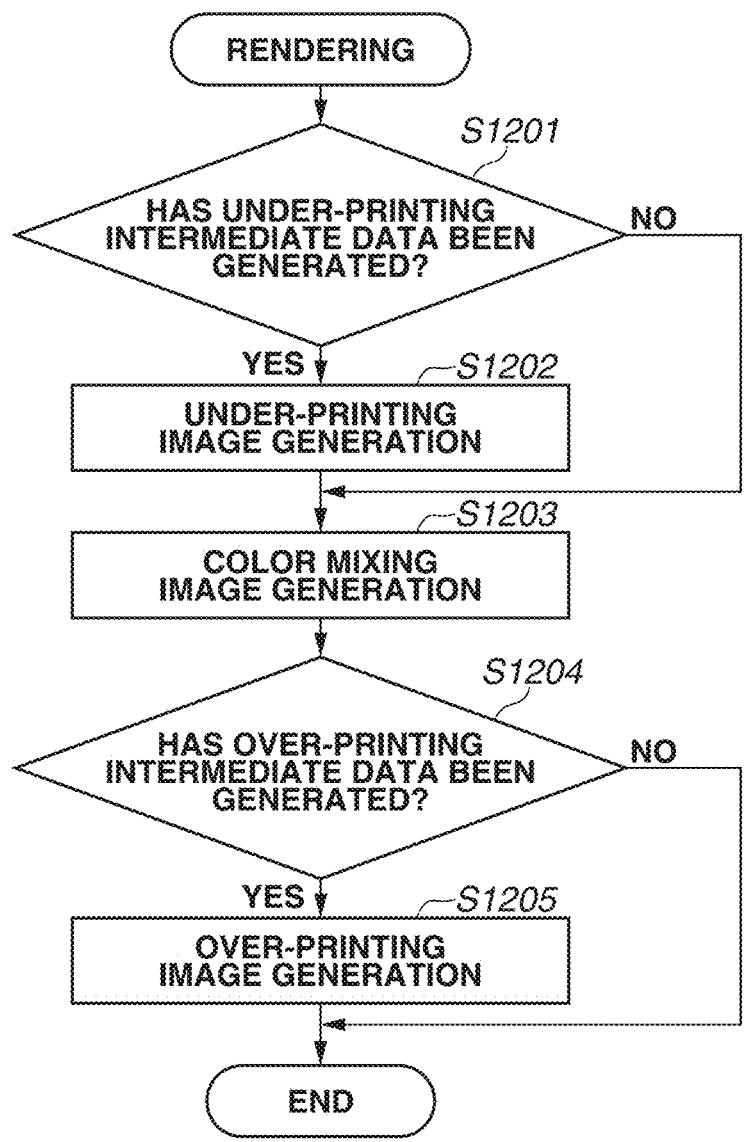

IMAGE FORMING APPARATUS, METHOD OF CONTROLLING THE SAME, AND STORAGE MEDIUM

BACKGROUND

Field of the Disclosure

The present disclosure generally relates to image forming and, more particularly, to an image forming apparatus, a method of controlling the same, and a storage medium.

Description of the Related Art

Japanese Patent Application Laid-Open No. 2008-028917 discusses an image forming apparatus that executes image formation while using, as an undercoat for favorably expressing a desired color using colored toner, toner for outputting a spot color, such as white, that cannot be expressed with CMYK (cyan, magenta, yellow, black). For example, when printing an image with a process color on black paper, such an image forming apparatus applies, for better color development, under-printing with white toner in a layer below an object to be drawn with the process color. Under-printing herein means that an object different from a certain object is drawn as an undercoat in a layer below the certain object.

In addition, examples of a case where a spot color is used as an undercoat include not only white toner under-printing but also, for example, a case in which, when an image is printed on the back side of a transparent sheet while being horizontally reversed, over-printing with white toner or the like is performed in the topmost layer so as to prevent transmitting light from the background. Over-printing herein means that an object different from a certain object drawn on a side opposite to a side to which a certain user refers is drawn as an undercoat in a layer above the certain object.

Japanese Patent Application Laid-Open No. 2017-024321 discusses an image forming apparatus that executes hidden-surface elimination on objects other than a drawing object positioned at the front, provided that any combining or transparency processing is not specified to be performed on a drawing object described in page description language (PDL).

When a certain image indicated by a drawing object is used as an undercoat and overpainted with an image indicated by another drawing object in a layer above the certain image, as in Japanese Patent Application Laid-Open No. 2008-028917, by use of an image forming apparatus that executes hidden-surface elimination, as in Japanese Patent Application Laid-Open No. 2017-024321, the following issues occur.

For example, when under-printing is performed, hidden-surface elimination is performed because a drawing object in a layer above another drawing object serving as an undercoat is specified as overpaint. As a result, the other drawing object serving as an undercoat, overlapping the drawing object in the layer above the other drawing object is eliminated, and an image containing the undercoat cannot be output.

Furthermore, when over-printing is performed, hidden-surface elimination is performed because a drawing object serving as an undercoat is specified to be used for overpaint. As a result, another drawing object in a layer below the drawing object serving as an undercoat, overlapping the drawing object serving as an undercoat is eliminated, and only the undercoat is output.

SUMMARY

The present disclosure is directed to enabling an image forming apparatus that executes hidden-surface elimination to output an image that contains an undercoat desired by a user.

According to an aspect of the present disclosure, an image forming apparatus includes an intermediate data generating unit configured to generate intermediate data based on page description language (PDL) data, and an elimination unit configured to eliminate a region included in a region of a second drawing object in a layer below a first drawing object and overlapping the first drawing object. The first drawing object being contained in the intermediate data. In a case where the second drawing object is not a drawing object indicating an undercoat image, the elimination unit eliminates the region included in the region of the second drawing object and overlapping the first drawing object. In a case where the second drawing object is a drawing object indicating an undercoat image, the elimination unit does not eliminate the region included in the region of the second drawing object and overlapping the first drawing object.

Further features of the present disclosure will become apparent from the following description of exemplary embodiments with reference to the attached drawings.

BRIEF DESCRIPTION OF THE DRAWINGS

FIGS. 1A and 1B illustrate examples of a configuration of a printing system and a sequence of the printing system.

FIG. 5 illustrates an example of page information.

FIGS. 7A, 7B, and 7C illustrate examples of closed-region information and hidden-surface elimination.

FIG. 8 is a flowchart illustrating an example of hidden-surface elimination.

FIG. 12 is a flowchart illustrating another example of rendering.

DESCRIPTION OF THE EMBODIMENTS

Various exemplary embodiments for carrying out the present disclosure are described below using the drawings. Configurations described in the following exemplary embodiments are merely examples, and the present disclosure is not limited to the illustrated configurations.

Figure 1A:
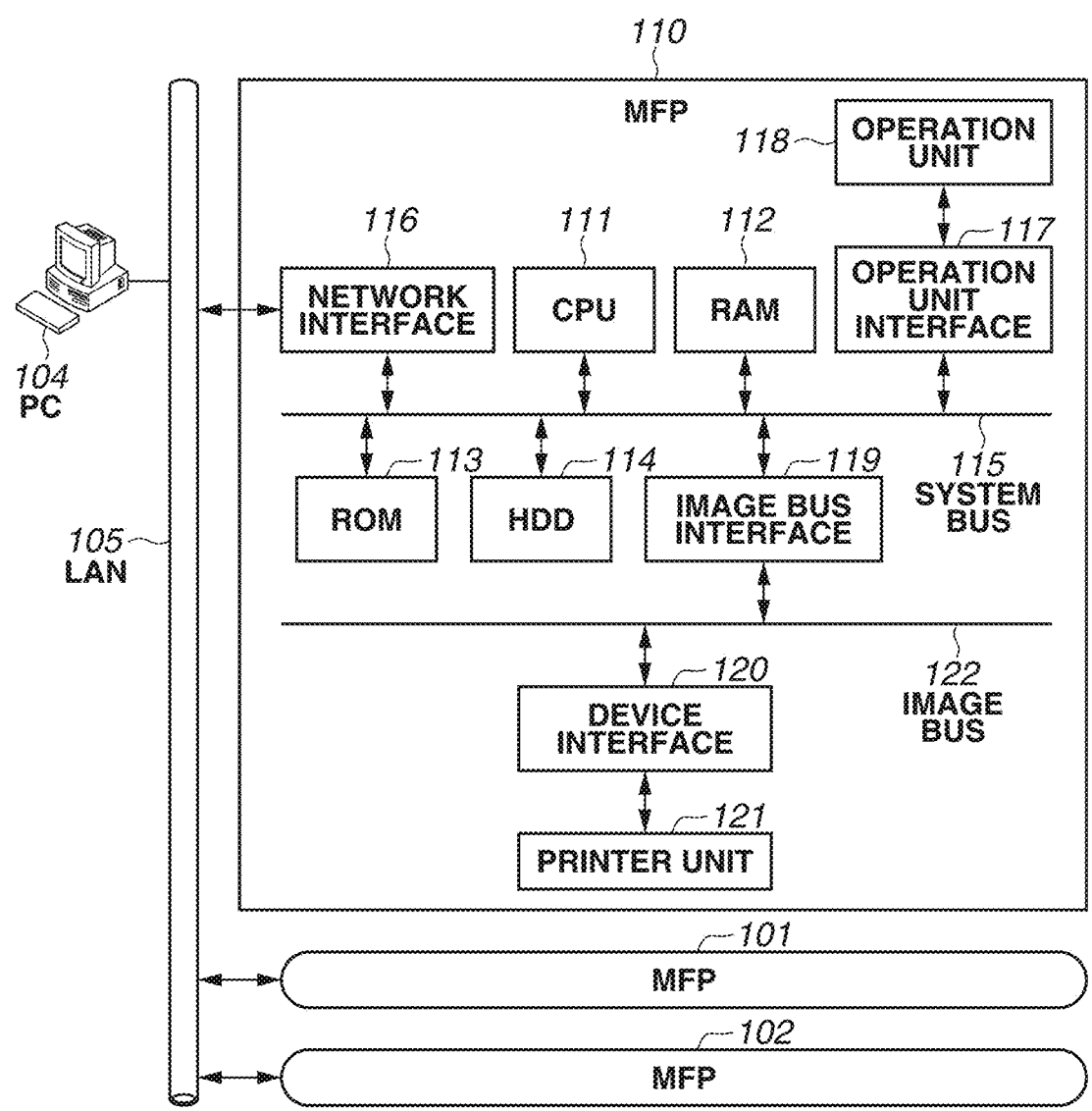

FIGS. 1A and 1B illustrate examples of a configuration of a printing system and a sequence of the printing system. The printing system according to the present exemplary embodiment includes a multi function peripheral (MFP) 110 serving as an example of an image forming apparatus and a personal computer (PC) 104 serving as an information processing apparatus. The MFP 110 and the PC 104 are connected to each other via a local area network (LAN) 105. An MFP 101 and an MFP 102 are connected to the LAN 105. While the present exemplary embodiment is described with the MFP 110 used as an example of an image forming apparatus, an image forming apparatus such as a single function peripheral (SFP) may alternatively be used.

The hardware configuration of the MFP 110 is described. A CPU 111 may integrally control the MFP 110. The CPU 111 transmits signals to various pieces of hardware via a bus line, thereby implementing execution of data communication with the other pieces of hardware.

The CPU 111 of the MFP 110 may control operation of the MFP 110 in accordance with control programs stored in a read-only memory (ROM) 113. More specifically, the CPU 111 executes an operating system (OS) that controls the MFP 110 and a driver program for controlling hardware. With these control programs executed, application programs installed on the OS interactively operate with one another, whereby a function operates and is controlled as desired by a user. The OS and the other various programs are stored in the ROM 113 and executed by being loaded into a random access memory (RAM) 112.

The RAM 112 may be a work memory in which to temporarily store a program and data that the CPU 111 uses for computing. The RAM 112 may also be a memory on which to temporarily store intermediate data generated within the MFP 110, a work region that is a work region during rendering, and image data that has been input. The ROM 113 may be a memory in which to store programs that the CPU 111 uses and various kinds of data. A hard disk drive (HDD) 114 may be a storage apparatus on which various kinds of data, various programs, and the like are stored.

A network interface 116 is an network interface for performing wired LAN communication, for example, based on such as the Ethernet. This network interface 116 may be a network interface for performing wireless LAN communication or may be a USB-LAN interface or the like.

An operation unit interface 117 transmits, to the CPU 111, information input by an operator from an operation unit 118. Being a user interface, such as a touch panel, that the user uses for operating the MFP 110, the operation unit 118 receive operations and input made by the user. The operation unit 118 can be used also as a display unit on which screens and the like to be used for operating the MFP 110 are displayed. The above-described pieces of hardware are connected to a system bus 115.

Being an interface for connecting to each other a system bus 115 and an image bus 122 that transfers image data at high speed, an image bus interface 119 is a bus bridge that converts a data structure to another data structure. A device interface 120 is connected on the image bus 122.

The device interface 120 controls data transfer between the printer unit 121 and the image bus 122.

The printer unit 121 prints an image on paper based on image data received via the device interface 120.

Next, an example of the sequence of printing in the printing system according to the present exemplary embodiment is described with reference to FIG. 1B.

In step S131, a user operates the PC 104 to give a print instruction for printing a desired image data.

In step S132, a printer driver on the PC 104 generates a print job containing the image data for which a print instruction has been given by the user. A print job herein is data that contains commands, image data, print setting information, and the like for causing the MFP 110 to execute printing.

In step S133, the PC 104 transmits the print job to the MFP 110 via the LAN 105.

In step S134, the CPU 111 of the MFP 110 controls the network interface 116 to receive the print job.

In step S135, the CPU 111 of the MFP 110 analyzes page description language (PDL) data contained in the received print job.

In step S136, the CPU 111 of the MFP 110 generates intermediate data for generating a bitmap image based on the result of thus analyzing the PDL data.

In step S137, the CPU 111 of the MFP 110 executes rendering based on the generated intermediate data to generate a bitmap image.

In step S138, the CPU 111 of the MFP 110 controls the printer unit 121 to print an image on paper based on the bitmap image.

<Software Configuration of MFP 110>

Figure 2:
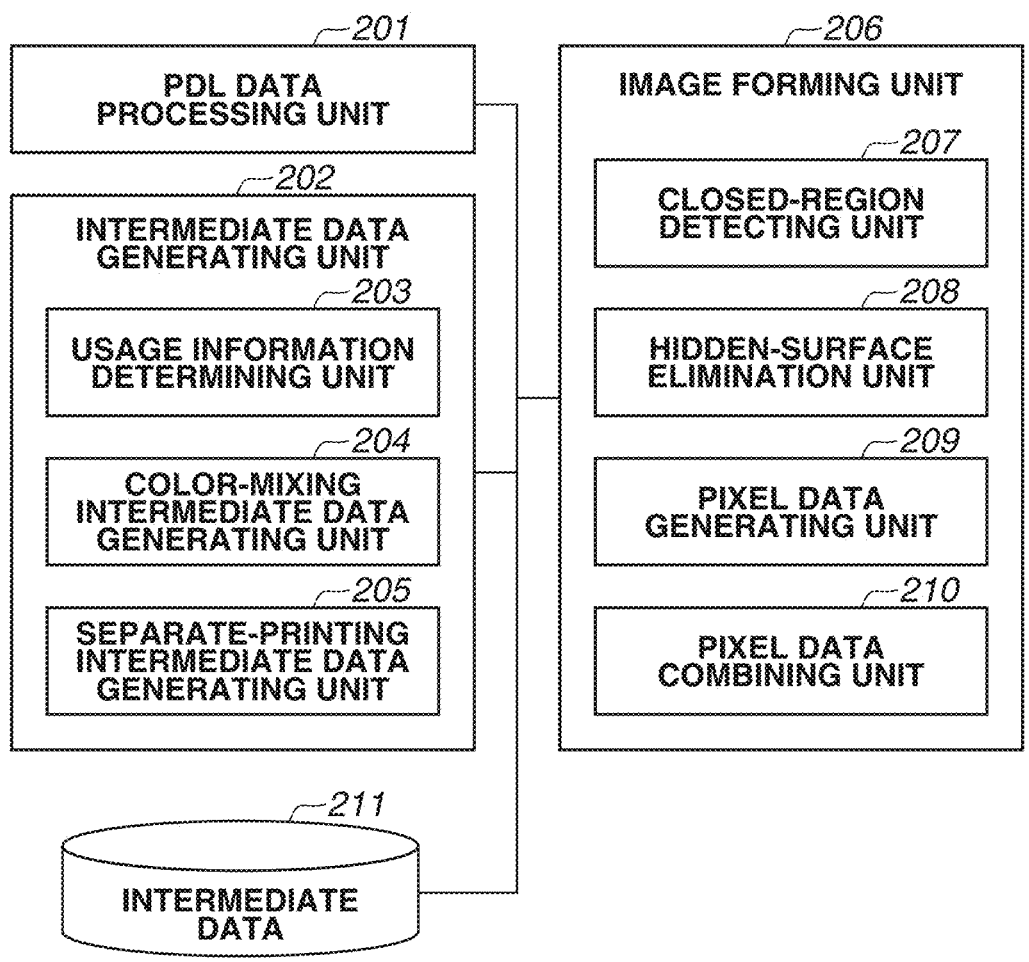
FIG. 2 illustrates an example of a software configuration of a multi function peripheral (MFP) 110.

FIG. 2 illustrates an example of a software configuration of the MFP 110. The ROM 113 has these pieces of software stored therein, and each of these pieces of software is loaded from the ROM 113 into the RAM 112 and executed by the CPU 111.

The CPU 111 executes a PDL data processing unit 201 to interpret the received PDL data, acquire page information and drawing object information contained in the page information, and transfer the page information and the drawing object information to the intermediate data generating unit 202.

The CPU 111 executes an intermediate data generating unit 202 to generate intermediate data based on the page information and the drawing object information that have been transferred from the PDL data processing unit 201. The intermediate data is used for image formation.

A usage information determining unit 203, a color-mixing intermediate data generating unit 204, and a separate-printing intermediate data generating unit 205 are parts of the intermediate data generating unit 201.

The CPU 111 executes the usage information determining unit 203 to determine usage information of a drawing object. The usage information of the drawing object is information as to how the drawing object is to be used. The usage information is, according to specification by a user, added by the printer driver or an application on the PC 104 that generates PDL data. Specifically, for example, when specifying the usage as under-printing, a user uses the printer driver to select a button or the like for giving an instruction to print white below a process color, whereby the usage information is appended to PDL data.

Thereafter, in a case where the usage information of the drawing object is determined to indicate under-printing, the CPU 111 executes the separate-printing intermediate data generating unit 205 to generate intermediate data 211 of the drawing object to which the usage information indicating under-printing has been appended. Under-printing, as used herein generally refers to a case where, in a layer below a certain object, another object is drawn as an undercoat.

As a case where under-printing is specified, a drawing object regarding which under-printing with white toner is indicated may be applicable. As such a case, a drawing object regarding which under-printing with black toner for attaching foil is indicated may also be applicable.

If the usage information of the drawing object is determined to indicate over-printing, the CPU 111 executes the separate-printing intermediate data generating unit 205 to generate the intermediate data 211 of the drawing object to which the usage information indicating over-printing has been added. Over-printing, as used herein generally refers to a case where when the lowermost layer is a side to which the user refers, an undercoat for the side to which the user refers is printed in the topmost layer with white toner or the like so as to prevent transmitting light from the background. Such over-printing may be used, for example, in a case where an image is printed on the back side of a transparent sheet while being horizontally reversed. In order to apply over-printing in a case where Y, M, C, K, and white toner is applied in that order to an intermediate transfer belt (not illustrated), white toner is transferred when a sheet of paper is conveyed for the first time. The sheet of paper may then be conveyed again, and Y, M, C, and K toner is transferred thereto.

As a case where under-printing is specified, a drawing object regarding which over-printing with white toner is indicated may be applicable.

The foregoing toner colors represent a typical example. Under-printing and over-printing are allowed to be performed with toner of a color different from white.

A job ticket is data in which print settings in terms of two-sided output, output paper, N-in-one printing, and so on have been described, and is used for notification of print settings for each job.

When the usage information of the drawing object is determined to indicate usage other than over-printing and under-printing, that is, color mixing, the color-mixing intermediate data generating unit 204 determines the drawing object to be used for color mixing and generates the intermediate data 211 without adding the usage information.

The intermediate data 211 generated by the intermediate data generating unit 202 is transferred to an image formation unit 206.

The CPU 111 executes the image formation unit 206 to generate a bitmap image based on the intermediate data 211 transferred from the intermediate data generating unit 202.

A closed-region detecting unit 207, a hidden-surface eliminating unit 208, a pixel data generating unit 209, and a pixel data combining unit 210 are parts of the image formation unit 206. Pixel data is data indicating a color of each drawing object.

The CPU 111 executes the closed-region detecting unit 207 to detect, based on the intermediate data 211, any closed region formed by the contours of drawing objects.

A determination as to the drawing objects that may not to be subjected to hidden-surface elimination may be made in the following manner. For example, when the usage information indicates under-printing, even in a case where another drawing object is specified as overpaint on a certain drawing object, toner for both of these drawing objects may be fixed as under-printing on a sheet of paper. Accordingly, any drawing object specified to be used for under-printing is not subjected to hidden-surface elimination. When the usage information of a drawing object is unspecified, usual color mixing may be intended for the drawing object, and hidden-surface elimination may therefore be performed on the drawing object.

The CPU 111 executes the pixel data generating unit 209 to generate pixel data of drawing objects present within the closed regions.

The CPU 111 executes the pixel data combining unit 210 to generate a bitmap image by combining the pixel data generated by the pixel data generating unit 209. A bitmap image herein is data obtained by combining pixel data of individual objects.

In the present exemplary embodiment, the CPU 111 may execute raster image processor (RIP) processing, such as processing of the intermediate data generating unit 202 and the image formation unit 206, in the form of software. The present disclosure is not limited to this example. For example, processing such as processing of the intermediate data generating unit 202 and the image formation unit 206 may be executed by a hardware RIP included in the MFP 110.

When a certain image indicated by a drawing object is used as an undercoat and overpainted with an image indicated by another drawing object in a layer above the certain image, as in Japanese Patent Application Laid-Open No. 2008-028917, by use of an image forming apparatus that executes hidden-surface elimination, as in Japanese Patent Application Laid-Open No. 2017-024321, the following issues occur.

For example, when under-printing is performed, hidden-surface elimination is performed because a drawing object in a layer above another drawing object serving as an undercoat is specified as overpaint. As a result, the drawing object serving as an undercoat, overlapping the drawing object in the layer above the drawing object serving as an undercoat is eliminated, and an image containing the undercoat cannot be printed.

Furthermore, when over-printing is performed, hidden-surface elimination is performed because a drawing object serving as an undercoat is specified to be used for overpaint. As a result, another drawing object in a layer below the drawing object serving as an undercoat, overlapping the drawing object serving as an undercoat is eliminated, and only the undercoat is printed. In the present exemplary embodiment, the following processing is executed for solving the above issues.

<Printing Based on PDL Data>

Figure 3:
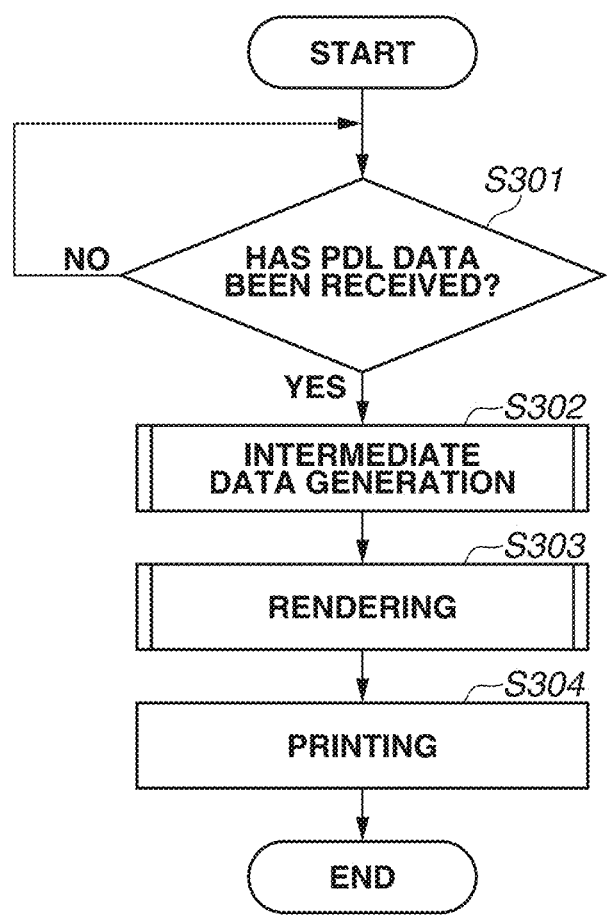
FIG. 3 is a flowchart illustrating an example of printing of page description language (PDL) data.

FIG. 3 is a flowchart illustrating an example of printing of PDL data. The CPU 111 loads a computer program stored in the ROM 113 into the RAM 112 and executes the computer program, whereby processing according to the flowchart in FIG. 3 is implemented. The flow in FIG. 3 is started upon power-on of the MFP 110.

In step S301, the CPU 111 determines whether PDL data has been received. If it is determined that PDL data has been received (YES in step S301), the CPU 111 stores the received PDL data in the HDD 114, and the processing proceeds to step S302. Otherwise (NO in step S301), the processing proceeds to step S301. The CPU 111 controls the network interface 116 to receive PDL data via the LAN 105.

In step S302, the CPU 111 analyzes the received PDL data and generates intermediate data for generating a bitmap image. Details of the processing are described with reference to FIG. 4.

Figure 4:
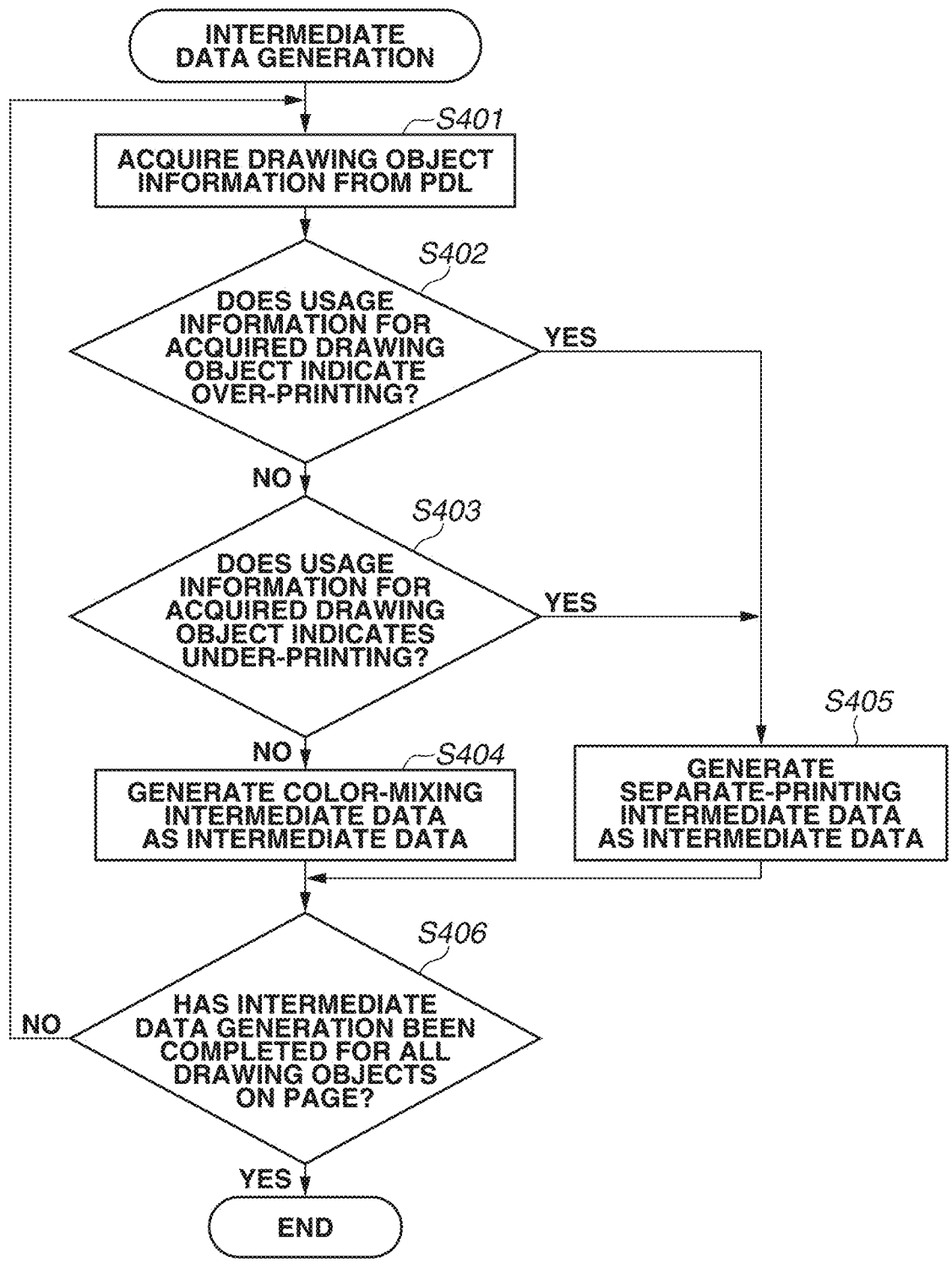
FIG. 4 is a flowchart illustrating an example of intermediate data generation.

FIG. 4 is a flowchart illustrating an example of intermediate data generation. The CPU 111 loads a computer program stored in the ROM 113 into the RAM 112 and executes the computer program, whereby processing according to the flowchart in FIG. 4 is implemented. The flow in FIG. 4 is started upon completion of receiving PDL data and storing the PDL data in the HDD 114 in step S301.

In step S401, the CPU 111 acquires an object from the PDL data received in step S301.

In step S402, the CPU 111 determines whether the usage information of the acquired drawing object indicates over-printing. If the usage information is determined to indicate over-printing (YES in step S402), the processing proceeds to step S405. Otherwise (NO in step S402), the processing proceeds to step S403. The processing is described with page information, which is illustrated as page information 500 in FIG. 5, taken as an example. FIG. 5 illustrates an example of the page information.

For example, the page information 500 is used for performing image formation on black-colored paper. The page information 500 contains a white under-printing object A 511 and a white under-printing object B 512 that indicate white-colored under-printing objects. The page information 500 is also page information that contains a gray object 513, an oblique-line pattern object 514, and a dot pattern object 515. For example, if the acquired drawing object is the white under-printing object A 511 or the white under-printing object B 512, the usage of the acquired drawing object is specified as under-printing. Accordingly, the processing proceeds to step S405. Instead, if the acquired drawing object is the gray object 513, the oblique-line pattern object 514, or the dot pattern object 515, the usage of the acquired drawing object is specified as "unspecified" (color mixing). Accordingly, the processing proceeds to step S404.

In step S403, the CPU 111 determines whether the usage information of the acquired drawing object indicates under-printing. If the usage information is determined to indicate under-printing (YES in step S403), the processing proceeds to step S405. Otherwise (NO in step S403), that is, if the usage information is determined to indicate color mixing, the processing proceeds to step S404.

In step S404, the CPU 111 generates intermediate data while setting, as color-mixing intermediate data, the drawing object that has been specified neither as under-printing nor as over-printing. For example, the CPU 111 generates intermediate data with the usage information of each of the gray object 513, the oblique-line pattern object 514, and the dot pattern object 515 set as "unspecified" (color mixing). Intermediate data previously generated for a certain drawing object and intermediate data generated for a drawing object different from the certain drawing object and present on the same page as the certain drawing object are combined together.

In step S405, the CPU 111 generates the intermediate data while setting, as separate-printing intermediate data, the drawing object specified to be used for under-printing or over-printing. For example, the CPU 111 generates the intermediate data 211 with the usage information of each of the white under-printing object A 511 and the white under-printing object B 512 set as under-printing. In the same manner as in step S404, intermediate data previously generated for a certain drawing object and intermediate data generated for a drawing object different from the certain drawing object and present on the same page as the certain drawing object are combined together.

In step S406, the CPU 111 determines whether intermediate data generation for all of the drawing objects on the page has been completed. If the intermediate data generation is determined to have been completed (YES in step S406), the processing ends. Otherwise (NO in step S406), the processing returns to step S401 and repeats step S401 and the following steps.

The following description refers back to the flow in FIG. 3. In step S303, the CPU 111 generates a bitmap image by performing rendering based on the generated intermediate data. Details of the processing are described with reference to FIG. 6.

Figure 6:
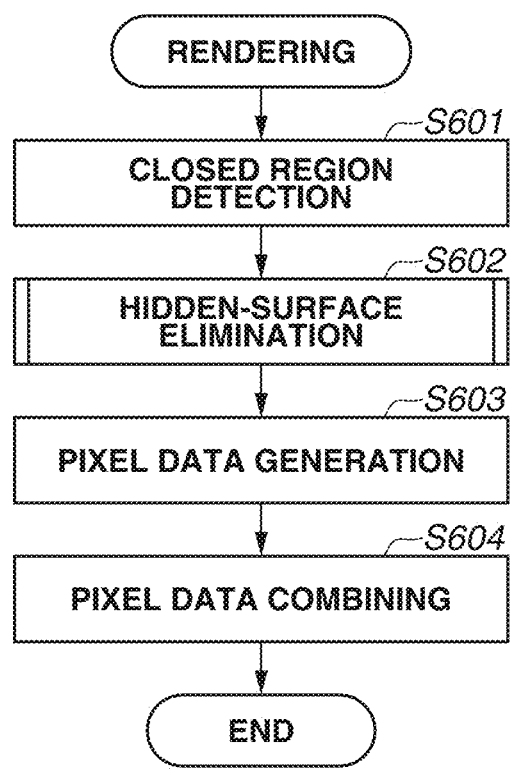
FIG. 6 is a flowchart illustrating an example of rendering.

FIG. 6 is a flowchart illustrating an example of the rendering. The CPU 111 loads a computer program stored in the ROM 113 into the RAM 112 and executes the computer program, whereby processing according to the flowchart in FIG. 6 is implemented. The flow in FIG. 6 is started upon completion of generating intermediate data in step S302.

In step S601, based on the generated intermediate data, the CPU 111 detects closed regions that are computed from contour information of the drawing objects. Closed regions are detected using a known technique. In this step, closed-region information indicating the individual closed regions thus detected and closed-region object information indicating various kinds of information about drawing objects included in the closed regions are generated. The closed regions, the closed-region information, and the closed-region object information are described with reference to FIGS. 7A, 7B, and 7C.

Figure 7A:
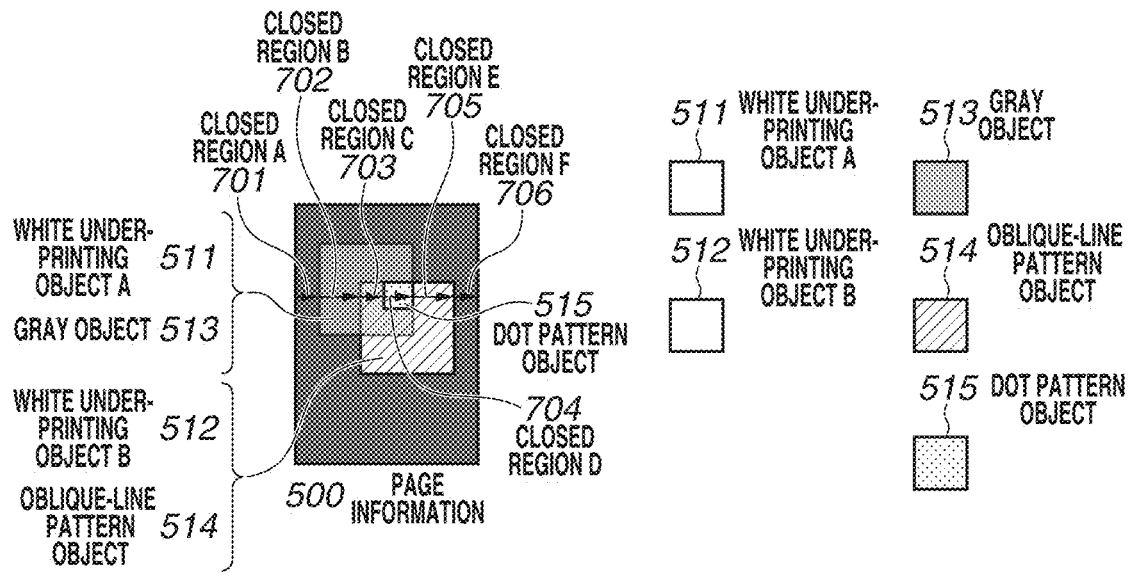
Figure 7B:
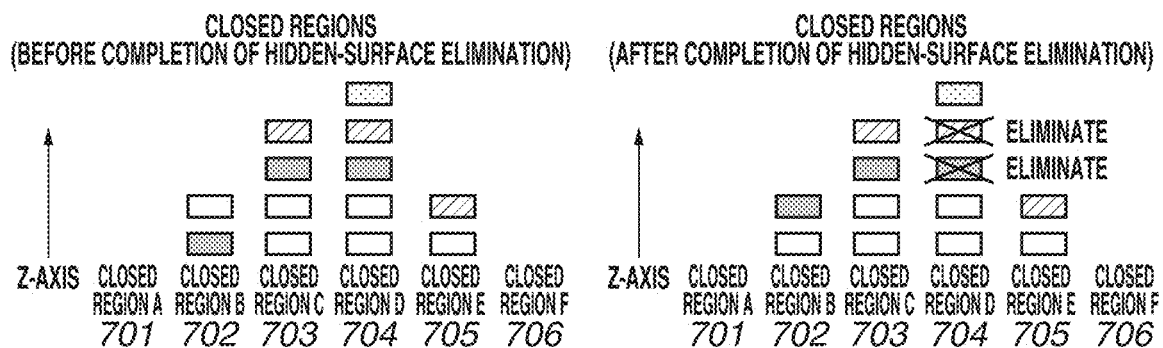

FIGS. 7A, 7B, and 7C illustrate examples of closed-region information and hidden-surface elimination. The page information 500 is composed of the white under-printing object A 511, the white under-printing object B 512, the gray object 513, the oblique-line pattern object 514, and the dot pattern object 515, which are described with reference to FIG. 5.

The CPU 111 according to the present exemplary embodiment performs image formation based on page information line by line. For example, when image formation is performed along a processing line indicated by the arrows in FIG. 7A, the CPU 111 detects, based on corresponding contour information of drawing objects on the line, closed regions partitioned by respective contours of the drawing objects. The closed regions include a closed region A 701 to a closed region F 706. The closed region A 701 to the closed region F 706 are composed of different combinations of drawing objects as indicated under "CLOSED REGIONS (BEFORE COMPLETION OF HIDDEN-SURFACE ELIMINATION)", and image formation is performed in accordance with the corresponding combinations.

For example, the closed region B 702 is a closed region composed of the white color under-printing object A 511 and the gray object 513. The closed region C 703 is a closed region composed of the white color under-printing object A 511, the white color under-printing object A 512, the gray object 513, and the oblique-line pattern object 514. Thus, each closed region is composed of a corresponding combination of drawing objects and is structured as illustrated in FIG. 7C. The CPU 111 performs closed-region detection on closed regions in each line using a known technique. In practice, closed regions are generated as illustrated under "CLOSED REGION (BEFORE COMPLETION OF HIDDEN-SURFACE ELIMINATION)" in FIG. 7B and "DATA STRUCTURE OF CLOSED REGIONS (BEFORE HIDDEN-SURFACE ELIMINATION)" in FIG. 7C.

Each piece of closed-region information is composed of the "pixel length" indicating the length of the corresponding closed region and the "number of objects" indicating the number of objects contained in the closed region.

When the closed regions are generated, pieces of closed-region object information each indicating various kinds of information on the corresponding drawing objects contained in each closed region are also generated. The closed-region object information may be generated in the form appended to corresponding image data as attribute information of the image data or may be managed, separately from the image data, in a region different from a region in which the image data is managed.

Each piece of closed-region object information is composed of the "fill type" indicating the type of the corresponding drawing object, the "usage information", and the "combining information" indicating a method in which to combine the corresponding drawing object. The "fill type" is broken down into specific types such as "flat" as represented by the white under-printing objects 511 and 512 and the gray object 513 and "pattern" as represented by the oblique-line pattern object 514 and the dot pattern object 515.

The "usage information" is information indicating usage for which the corresponding drawing object is intended. For example, the "usage information" is information indicating usage that is under-printing or over-printing or is information indicating usage that is for usual image information. The drawing objects the usage of each of which is specified as under-printing or over-printing is specified to be drawn with a spot color, such as a white color, that cannot be expressed with CMYK. In contrast, each of the other drawing objects is specified to be drawn with a process color that can be expressed with CMYK.

The "combining information" is information indicating a method in which to combine the corresponding drawing object. For example, the "combining information" is broken down into specific information such as "overpaint" indicating that only the corresponding drawing object should be printed if that drawing object is present in the topmost layer and "transparent" indicating that corresponding drawing object should be transparently printed such that an object present in a layer below the corresponding drawing object can be seen therethrough. By being referred to, the combining information is used for specifying a method in which to combine the drawing object present in each layer when being drawn.

The following description refers back to FIG. 6. In step S602, the CPU 111 performs hidden-surface elimination on each of the closed regions. Hidden-surface elimination, by general definition, may refer to processing to detect from the closed region information detected in step S601, based on instructions on combining in the closed-region object information, any closed region composed of at least one drawing object to be drawn. That is, hidden-surface elimination is processing to eliminate any drawing object that may not be drawn, such as a drawing object overlapping another drawing object. In this regard, the present exemplary embodiment attaches a great significance to hidden-surface elimination and can avoid eliminating a desired undercoat by determining not only the above-described instruction about combining but also the usage information. Details of such hidden-surface elimination are described with reference to FIG. 8.

FIG. 8 is a flowchart illustrating an example of the hidden-surface elimination. The CPU 111 loads a computer program stored in the ROM 113 into the RAM 112 and executes the computer program, whereby processing according to the flowchart in FIG. 8 is implemented. The flow in FIG. 8 is started when closed regions are detected in step S601.

In step S801, the CPU 111 acquires closed-region information of the closed regions. In this processing, the CPU 111 acquires the closed-region information sequentially from the origin at the left end of a page line by line.

In step S802, the CPU 111 assigns "FALSE" to a hidden-surface elimination flag. The hidden-surface elimination flag is a flag for setting whether to perform hidden-surface elimination. In the present exemplary embodiment, "FALSE" is assigned to the hidden-surface elimination flag in step S802 in order that this flag may be initialized right when the closed-region information is acquired.

In step S803, the CPU 111 acquires closed-region object information on inside the closed region indicated by the closed-region information acquired in S801. A direction in which the closed-region object information is acquired is described below with reference to FIG. 7B. For example, in the case of the closed region D 704 illustrated under "CLOSED REGION (BEFORE THE COMPLETION OF HIDDEN-SURFACE ELIMINATION)", the closed-region object information is acquired starting from the dot pattern object 515, or the highest object, toward the lowest object in a direction along the Z axis. The closed-region object information is various kinds of information (such as usage information and combining information) about drawing objects (hereinafter closed-region objects) obtained by partitioning given drawing objects into the individual closed regions as illustrated in FIG. 7B.

In step S804, the CPU 111 determines whether the hidden-surface elimination flag is "TRUE". If the hidden-surface elimination flag is determined to be "TRUE" (YES in step S804), the processing proceeds to step S805. Otherwise (NO in step S804), that is, if the hidden-surface elimination flag has been determined to be FALSE, the processing proceeds to step S808. This hidden-surface elimination flag is a flag applied to all of the closed regions in common and is not each of different flags applied to each closed region. Therefore, the flag is initialized as in step S802 each time the closed region is acquired.

In step S805, the CPU 111 determines whether the usage information contained in the closed-region object information acquired in step S803 indicates over-printing. If the usage information is determined to indicate over-printing (YES in step S805), the processing proceeds to step S810. By thus proceeding to S810, the processing ensures that deletion of the closed-region object in a layer below the closed-region object indicating over-printing can be avoided. Accordingly, the processing can achieve the aim of over-printing. Otherwise (NO in step S805), the processing proceeds to step S806.

In step S806, the CPU 111 determines whether the usage information contained in the closed-region object information acquired in step S803 indicates under-printing. If the usage information is determined to indicate under-printing (YES in step S806), the processing proceeds to step S808. Otherwise (NO in step S806), that is, if the usage information indicates color mixing, the processing proceeds to step S807.

In step S807, the CPU 111 eliminates, from the RAM 112, the closed-region object that is indicated by the closed-region object information acquired in step S803.

In step S808, the CPU 111 determines whether the combining information contained in the closed-region object information acquired in S803 indicates overpaint. If the combining information is determined to indicate overpaint (YES in step S808), the processing proceeds to step S809. Otherwise (NO in step S808), the processing proceeds to step S810.

In step S809, the CPU 111 assigns "TRUE" to the hidden-surface elimination flag. Thus assigning "TRUE" to the hidden-surface elimination flag makes it possible to eliminate the closed-region object that has been specified to be neither under-printing nor over-printing. For example, the gray object 513 and the oblique-line pattern object 514 are eliminated as with the closed region D 704 under "CLOSED REGION (AFTER THE COMPLETION OF HIDDEN-SURFACE ELIMINATION)" in FIG. 7B.

In step S810, the CPU 111 determines whether the processing has been completed for all of the closed-region objects within the closed region indicated by the closed-region information acquired in step S801. If the processing is determined to have been completed for all (YES in step S810), the processing proceeds to step S811. Otherwise (NO in step S810), the processing returns to step S803, and the processing starting from step S803 is performed on the subsequent closed-region object.

In step S811, the CPU 111 determines whether the processing has been executed on all of the closed regions on the page. If the processing is determined to have been executed on all of the closed regions (YES in step S811), the processing ends. Otherwise (NO in step S811), the processing returns to step S801. Thus determining whether each closed region is specified as overpaint makes it possible to eliminate only a part included in drawing objects in layers below a drawing object specified as overpaint and overlapping the drawing object specified as overpaint.

The following description refers back to the flow in FIG. 6. In step S603, the CPU 111 generates pixel data for each drawing object that is present in each of the closed regions.

In step S604, the CPU 111 generates a bitmap image by performing combining based on the pixel data generated in step S603 and the combining information. In step S604, under-printing objects with the same color that are overlaid on each other as in the case of the under-printing objects with a white color in the closed region C 703 in FIG. 7B are treated as one object.

The following description refers back to the flow in FIG. 3. In step S304, the CPU 111 controls the printer unit 121 to print an image on paper based on the generated bitmap image.

By executing the above-described processing, an image forming apparatus that executes hidden-surface elimination is enabled to output an image containing an undercoat desired by a user.

The image forming apparatus according to the present exemplary embodiment is described as the MFP 110 that is capable of printing by use of the printer unit 121 but is not limited thereto. For example, the image forming apparatus may be a print server or the like not provided with a printer unit and configured only to generate intermediate data and perform rendering. By being configured to transmit a bitmap image generated through rendering to a printer via a network interface or a video cable without executing printing in S304, a print server is enabled to execute the processing according to the present exemplary embodiment.

In the present exemplary embodiment, an example is described in which the processing in step S811 for performing control so as not to eliminate a drawing object specified to be used for under-printing and so as not to eliminate a drawing object in a layer immediately below a drawing object specified to be used for over-printing is executed. However, this example is not limiting. For example, a unit (for example, that receives settings from a user via a setting screen) configured to set whether to execute the processing in S811 may be used to determine whether to execute the processing in the processing in S811.

In the first exemplary embodiment, an example in which hidden-surface elimination is not performed on drawing objects such as one specified to be used for under-printing is described. In a second exemplary embodiment, an example is described in which rendering of drawing objects for under-printing, drawing objects for over-printing, and drawing objects that are neither for under-printing nor for over-printing is separately performed, and the description mainly focuses on differences from the first exemplary embodiment. In the present exemplary embodiment, after generation of intermediate data according to a conventionally available technique, intermediate data for under-printing and intermediate data for over-printing are generated. Therefore, the intended functions can be more easily implemented than by, as in the first exemplary embodiment, incorporating genera- tion of such under-printing and over-printing intermediate data into a conventionally available method of generating intermediate data.

<Software Configuration of MFP in Second Exemplary Embodiment>

Figure 9:
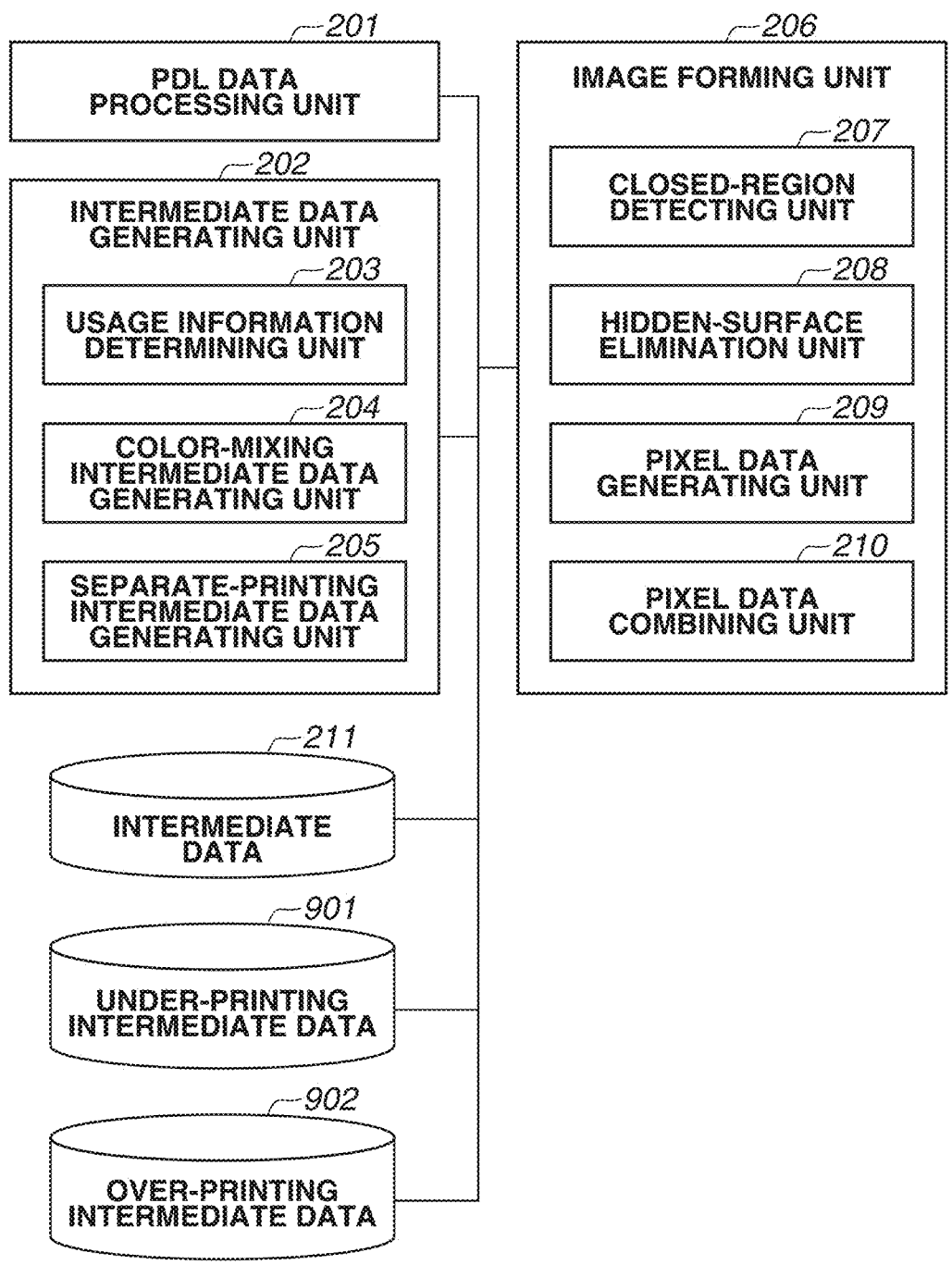
FIG. 9 illustrates another example of a software configuration of the MFP 110.

FIG. 9 illustrates another example of a software configuration of the MFP 110. The ROM 113 has these pieces of software stored therein, and each of these pieces of software is loaded from the ROM 113 into the RAM 112 and executed by the CPU 111.

In the second exemplary embodiment, intermediate data for under-printing (hereinafter under-printing intermediate data) and intermediate data for over-printing (hereinafter over-printing intermediate data) are newly generated. The CPU 111 executes the separate-printing intermediate data generating unit 205 to generate under-printing intermediate data 901 in a case where the usage of a corresponding drawing object is determined to be indicated as under-printing. The CPU 111 executes the separate-printing intermediate data generating unit 205 to generate over-printing intermediate data 902 in a case where the usage of a corresponding drawing object is determined to be indicated as over-printing.

The under-printing intermediate data 901 and the over-printing intermediate data 902 are transferred to the image formation unit 206 in the same manner as the intermediate data 211.

In the present exemplary embodiment, a bitmap image for under-printing is generated based on the under-printing intermediate data 901. In addition, another bitmap image is generated based on the intermediate data 211 as processing different from the processing based on the under-printing intermediate data 901. Finally, still another bitmap image for over-printing is generated based on the over-printing intermediate data 902. That is, image formation is performed to form different images based on a plurality of kinds of intermediate data, whereby a under-printing drawing object is prevented from being eliminated by hidden-surface elimination.

<Details of Intermediate Data Generation in Second Exemplary Embodiment>

Figure 10:
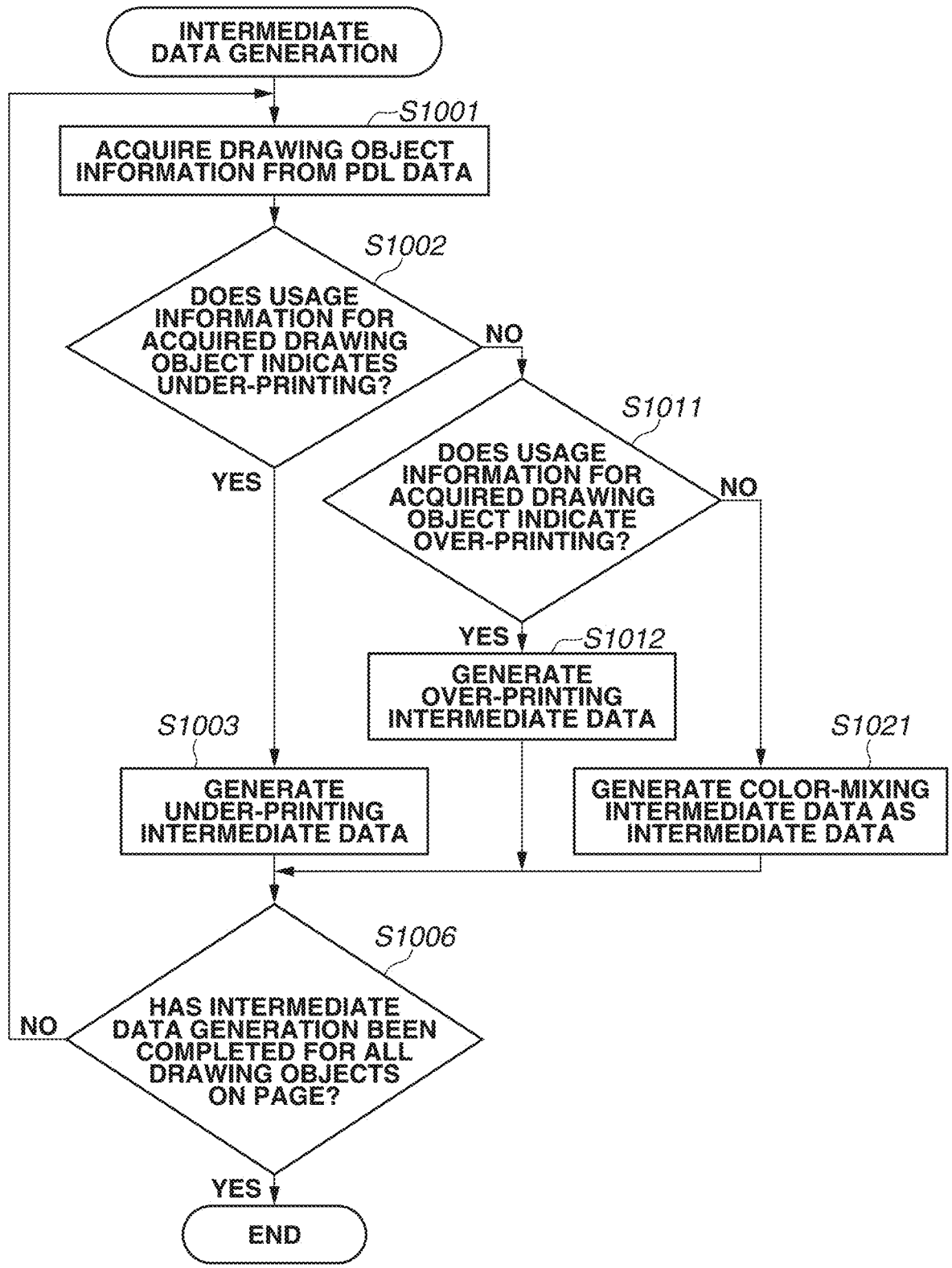
FIG. 10 is a flowchart illustrating another example of intermediate data generation.

FIG. 10 is a flowchart illustrating another example of intermediate data generation. The CPU 111 loads a computer program stored in the ROM 113 into the RAM 112 and executes the computer program, whereby processing according to the flowchart in FIG. 10 is implemented. The flow in FIG. 10 is started upon completion of receiving PDL data and storing the PDL data in the HDD 114 in step S301.

In step S1001, the CPU 111 acquires a drawing object from the PDL data received in step S301.

Figure 11:
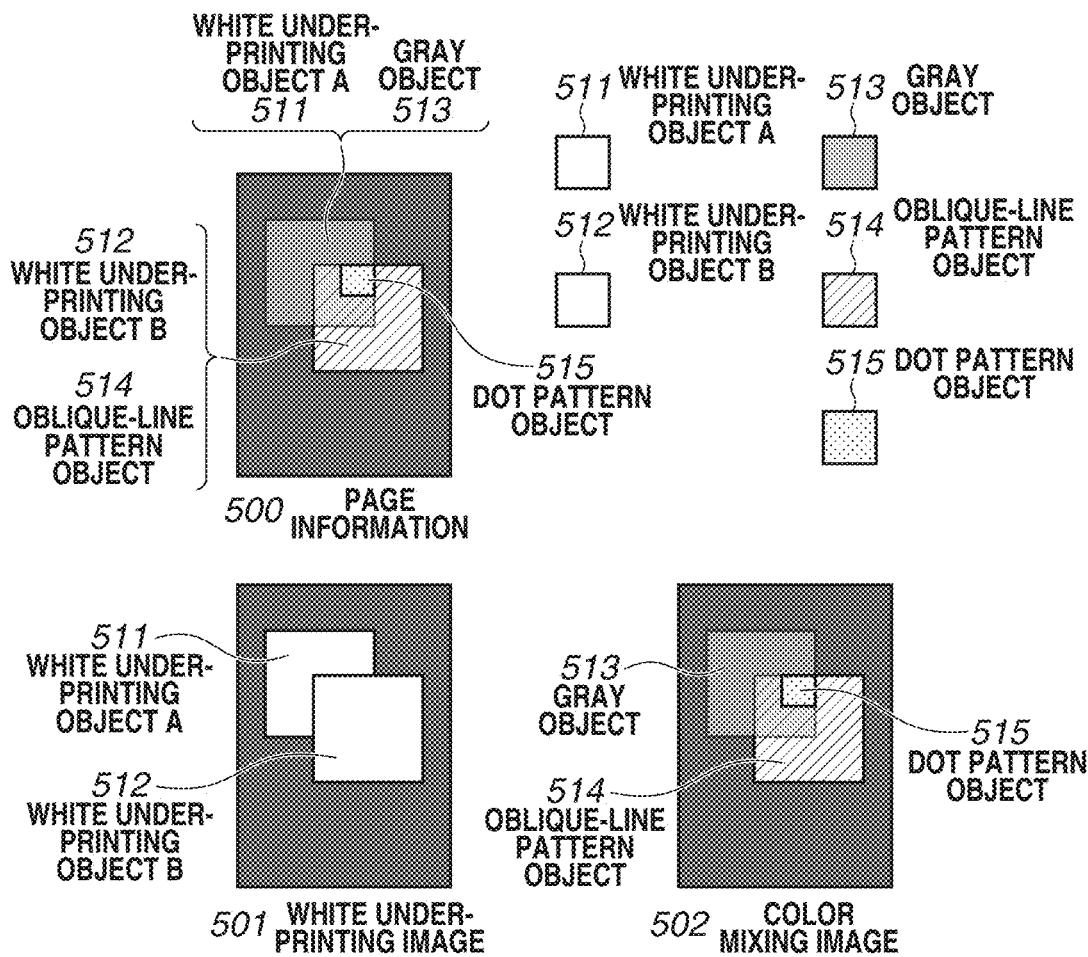
FIG. 11 illustrates another example of page information.

In step S1002, the CPU 111 determines whether the usage information of the acquired drawing object indicates under-printing. If the usage information is determined to indicate under-printing (YES in step S1002), the processing proceeds to step S1003. Otherwise (NO in step S1002), the processing proceeds to step S1011. The processing is described with page information, which is illustrated as page information 500 in FIG. 11, taken as an example. FIG. 11 illustrates another example of the page information.

For example, when image formation of the page information 500 is performed on black paper, the page information 500 contains the white under-printing object A 511 and the white under-printing object B 512 that indicate white-colored under-printing objects. The page information 500 further contains the gray object 513, the oblique-line pattern object 514, and the dot pattern object 515. For example, if the acquired drawing object is the white under-printing object A 511 or the white under-printing object B 512, the usage of the acquired drawing object is specified as under-printing. Accordingly, the processing proceeds to step S1003. Instead, if the drawing object is the gray object 513, the oblique-line pattern object 514, or the dot pattern object 515, the usage of the acquired drawing object is specified as "unspecified" (color mixing). Accordingly, the processing proceeds to step S1011.

In step S1003, the CPU 111 generates under-printing intermediate data while setting, as the under-printing intermediate data, the drawing object that has been specified as under-printing. For example, the CPU 111 generates intermediate data with the usage information of each of the white under-printing object A 511 and the white under-printing object B 512 set as under-printing. Intermediate data previously generated for a certain drawing object is combined with intermediate data generated for another drawing object present on the same page as the certain drawing, provided that those drawing objects correspond to the same usage.

In step S1011, the CPU 111 determines whether the usage information of the acquired drawing object indicates over-printing. If the usage information is determined to indicate over-printing (YES in step S1011), the processing proceeds to step S1012. Otherwise (NO in step S1011), that is, if the usage information of the drawing object indicates "unspecified" (color mixing), the processing proceeds to step S1021.

In step S1012, the CPU 111 generates over-printing intermediate data while setting, as the over-printing intermediate data, the drawing object that has been specified as over-printing. Intermediate data previously generated for a certain drawing object is combined with intermediate data generated for another drawing object present on the same page as the certain drawing, provided that those drawing objects correspond to the same usage.

In step S1021, the CPU 111 generates intermediate data while setting, as color-mixing intermediate data, the drawing object specified to be used neither for under-printing nor for over-printing. For example, the CPU 111 generates intermediate data while assuming that the usage information of each of the gray object 513, the oblique-line pattern object 514, and the dot pattern object 515 is unspecified (color mixing). Intermediate data previously generated for a certain drawing object is combined with intermediate data generated for another drawing object present on the same page as the certain drawing, provided that those drawing objects correspond to the same usage.

In step S1004, the CPU 111 determines whether intermediate data generation for all of the drawing objects on the page has been completed. If the intermediate data generation is determined to have been completed (YES in step S1004), the processing ends. Otherwise (NO in step S1004), the processing returns to step S1001 and repeats step S1001 and the following steps.

<Details of Rendering in Second Exemplary Embodiment>

FIG. 12 is a flowchart illustrating an example of rendering. The CPU 111 loads a computer program stored in the ROM 113 into the RAM 112 and executes the computer program, whereby processing according to the flowchart in FIG. 12 is implemented. The flow in FIG. 12 is started upon completion of generating the intermediate data in step S302.

In step S1201, the CPU 111 checks on the under-printing intermediate data 901 and determines whether under-printing intermediate data has been generated. If it has determined that under-printing intermediate data has been generated (YES in step S1201), the processing proceeds to step S1202. Otherwise (NO in step S1201), the processing proceeds to step S1203.

In step S1202, the CPU 111 executes image generation for under-printing based on the under-printing intermediate data 901. The image generation for under-printing is implemented by executing rendering described with reference to FIG. 6 on the under-printing intermediate data 901.

In step S1203, the CPU 111 executes image generation based on the intermediate data 211. The image generation is implemented by executing rendering described with reference to FIG. 6 on the intermediate data 211.

In step S1204, the CPU 111 checks on the over-printing intermediate data 902 and determines whether over-printing intermediate data has been generated. If it has determined that over-printing intermediate data has been generated (YES in step S1204), the processing proceeds to step S1205. Otherwise (NO in step S1204), the processing ends.

In step S1205, the CPU 111 executes image generation for over-printing based on the over-printing intermediate data 902. The image generation for over-printing is implemented by executing rendering described using FIG. 6 on the over-printing intermediate data 902.

By executing the above-described processing, an image forming apparatus that executes hidden-surface elimination is enabled to print an undercoat image desired by a user. Furthermore, the intended functions can be more easily implemented than by, as in the first exemplary embodiment, incorporating generation of such under-printing and over-printing intermediate data into a conventionally available method of generating intermediate data.

Other Exemplary Embodiments

The present disclosure is directed to being accomplished by executing the following processing. Specifically, a computer (or a CPU, a micro processing unit (MPU), or the like) of a system or an apparatus reads out a program code configured to implement the functions according to either of the above-described exemplary embodiments and stored on a storage medium with the storage medium supplied to the system or the apparatus. In such a case, the program code itself read out from the storage medium implements the functions according to either of the above-described exemplary embodiments, which means that the program code constitutes the present disclosure.

The present disclosure also includes a case where the functions according to either of the above-described exemplary embodiments are implemented with a computer executing program code read out by the computer. In addition, the present disclosure includes a case where an OS or the like that is operating on the computer performs a part or the entirety of actual processing based on instructions from the program code and the functions according to either of the above-described exemplary embodiments are implemented by the processing.

Other Embodiments

Embodiment(s) of the present disclosure can also be realized by a computerized configuration(s) of a system or apparatus that read(s) out and execute(s) computer executable instructions (e.g., one or more programs) recorded on a storage medium (which may also be referred to more fully as a 'non-transitory computer-readable storage medium') to perform the functions of one or more of the above-described embodiment(s) and/or that include(s) one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-236394, filed Dec. 18, 2018, which is hereby incorporated by reference herein in its entirety.

What is claimed is:

1. An image forming apparatus comprising:
at least one controller, having at least one processor which executes instructions stored in at least one memory and/or at least one circuitry, being configured to:
generate intermediate data based on page description language (PDL) data; and
eliminate drawing information of a region of a second drawing object in a layer below a first drawing object, where the first drawing object and the second drawing object overlap,
wherein the first drawing object and the second drawing object are contained in the generated intermediate data,
wherein, in a case where the first drawing object is not a transparent object with which a drawing object in a layer below the transparent object is composited and the second drawing object is not a drawing object with which information indicating an undercoat image that is an image for increasing visibility of toner to be placed on the image is associated, the at least one controller eliminates the drawing information of the region of the second drawing object, where the first drawing object and the second drawing object overlap, and
wherein, in a case where the first drawing object is not the transparent object and the second drawing object is the drawing object with which the information indicating the undercoat image is associated, the at least one controller does not eliminate the drawing information of the region of the second drawing object, where the first drawing object and the second drawing object overlap.

2. The image forming apparatus according to claim 1, wherein the first drawing object is not the transparent object and in a case where the second drawing object is not the drawing object with which the information indicating the undercoat image is associated, the at least one controller eliminates, with respect to each individual closed region formed by contours of the first drawing object and the second drawing object, the drawing information of the region of the second drawing object, where the first drawing object and the second drawing object overlap.

3. The image forming apparatus according to claim 1, wherein the at least one controller generates a bitmap image based on the generated intermediate data, and
wherein, in a case where a third drawing object with which the information indicating the undercoat image is associated is present in a layer below the second drawing object with which the information indicating the undercoat image is associated, the at least one controller generates a bitmap image based on any one of the second drawing object and the third drawing object with respect to at least a region where the second drawing object and the third drawing object overlap.

4. The image forming apparatus according to claim 3, wherein, in a case where a color indicated by the third drawing object and a color indicated by the second drawing object are the same, the at least one controller generates a bitmap image based on any one of the second drawing object and the third drawing object with respect to at least the region where the second drawing object and the third drawing object overlap.

5. The image forming apparatus according to claim 1, wherein the first drawing object is specified to be drawn with a process color, and
wherein the second drawing object with which the information indicating the undercoat image is associated is specified to be drawn with a spot color.

6. The image forming apparatus according to claim 1, further comprising a printer configured to print an image based on a bitmap image generated based on the intermediate data on paper.

7. The image forming apparatus according to claim 6, further comprising a transmitter configured to transmit a bitmap image based on the intermediate data to the printer.

8. A method of controlling an image forming apparatus, the method comprising:
generating intermediate data based on page description language (PDL) data; and
eliminating drawing information of a region of a second drawing object in a layer below a first drawing object, where the first drawing object and the second drawing object overlap,
wherein the first drawing object and the second drawing object are contained in the generated intermediate data,
wherein, in a case where the first drawing object is not a transparent object with which a drawing object in a layer below the transparent object is composited and the second drawing object is not a drawing object with which information indicating an undercoat image that is an image for increasing visibility of toner to be placed on the image is associated, the drawing information of the region of the second drawing object, where the first drawing object and the second drawing object overlap, is eliminated, and
wherein, in a case where the first drawing object is not the transparent object and the second drawing object is the drawing object with which the information indicating the undercoat image is associated, the drawing information of the region of the second drawing object, where the first drawing object and the second drawing object overlap, is not eliminated.

9. A non-transitory computer-readable storage medium storing a program that, when executed by a computer, causes the computer to perform a method of controlling an image forming apparatus, the method comprising:

generating intermediate data based on page description language (PDL) data; and eliminating drawing information of a region of a second drawing object in a layer below a first drawing object, where the first drawing object and the second drawing object overlap, wherein the first drawing object and the second drawing object are contained in the generated intermediate data, wherein, in a case where the first drawing object is not a transparent object with which a drawing object in a layer below the transparent object is composited and the second drawing object is not a drawing object with which information indicating an undercoat image that is an image for increasing visibility of toner to be placed on the image is associated, the drawing information of the region of the second drawing object, where the first drawing object and the second drawing object overlap, is eliminated, and wherein, in a case where the first drawing object is not the transparent object and the second drawing object is the drawing object with which the information indicating the undercoat image is associated, the drawing information of the region of the second drawing object, where the first drawing object and the second drawing object overlap, is not eliminated.

* * * * *